United States Patent [19]

Aboussouan

[11] 4,265,369

[45] May 5, 1981

[54] TAPE CARTRIDGE DISPENSER

[76] Inventor: Michel F. Aboussouan, 10609 Jimenez St., Lakeview Terrace, Calif. 91342

[21] Appl. No.: 10,819

[22] Filed: Feb. 9, 1979

[51] Int. Cl.³ .......................................... B65D 85/672
[52] U.S. Cl. ..................................... 221/87; 221/227; 221/271; 206/387; 312/20
[58] Field of Search ................. 221/87, 227, 232, 271; 206/387; 312/20, 15, 16, 18, 19, 71, 319

[56] References Cited

U.S. PATENT DOCUMENTS

| 3,926,310 | 12/1975 | Ackeret | 206/387 |
| 4,030,601 | 6/1977 | Ackeret | 206/387 |
| 4,046,255 | 9/1977 | Ackeret | 206/387 |
| 4,087,145 | 5/1978 | Weavers | 206/387 |
| 4,162,112 | 7/1979 | Konkler | 206/387 |

Primary Examiner—Allen N. Knowles
Attorney, Agent, or Firm—Roger A. Marrs

[57] ABSTRACT

A cartridge dispenser is disclosed herein for storing a pre-recorded program tape cartridge which includes a box-like construction having a side opening defining an entrance into an internal storage compartment for slidably receiving the cartridge. A yieldable, spring-loaded lock mechanism is in the compartment and bears against the back side of the cartridge. A pivotal latch mechanism cooperates with the lock mechanism to selectively release the lock mechanism for forcibly urging the cartridge through the entrance externally of the box-like construction.

8 Claims, 8 Drawing Figures

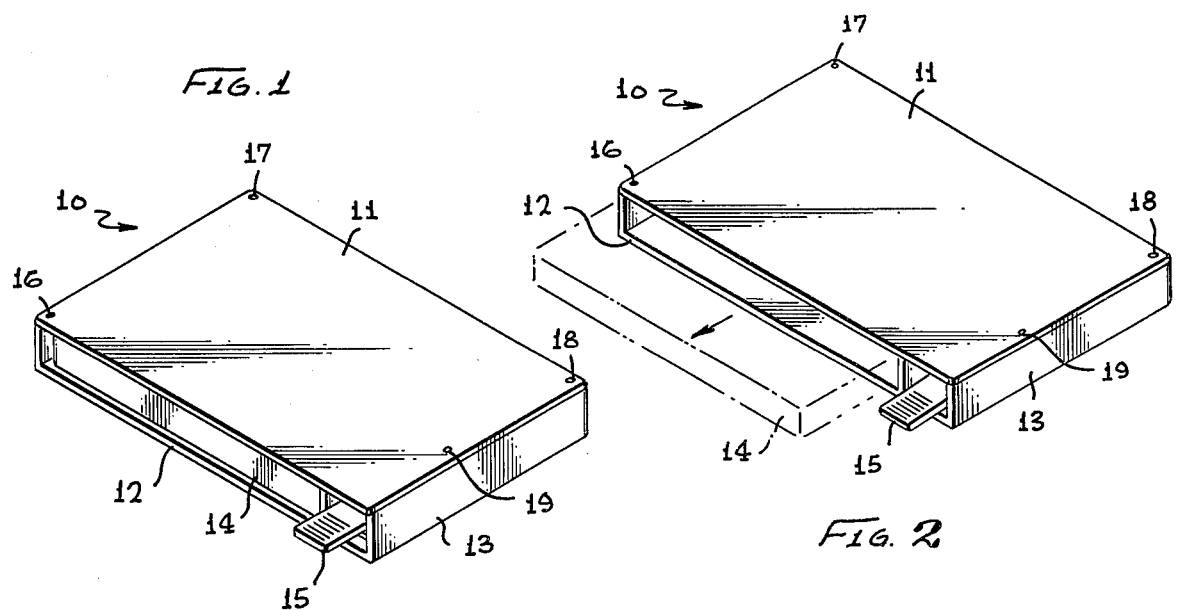
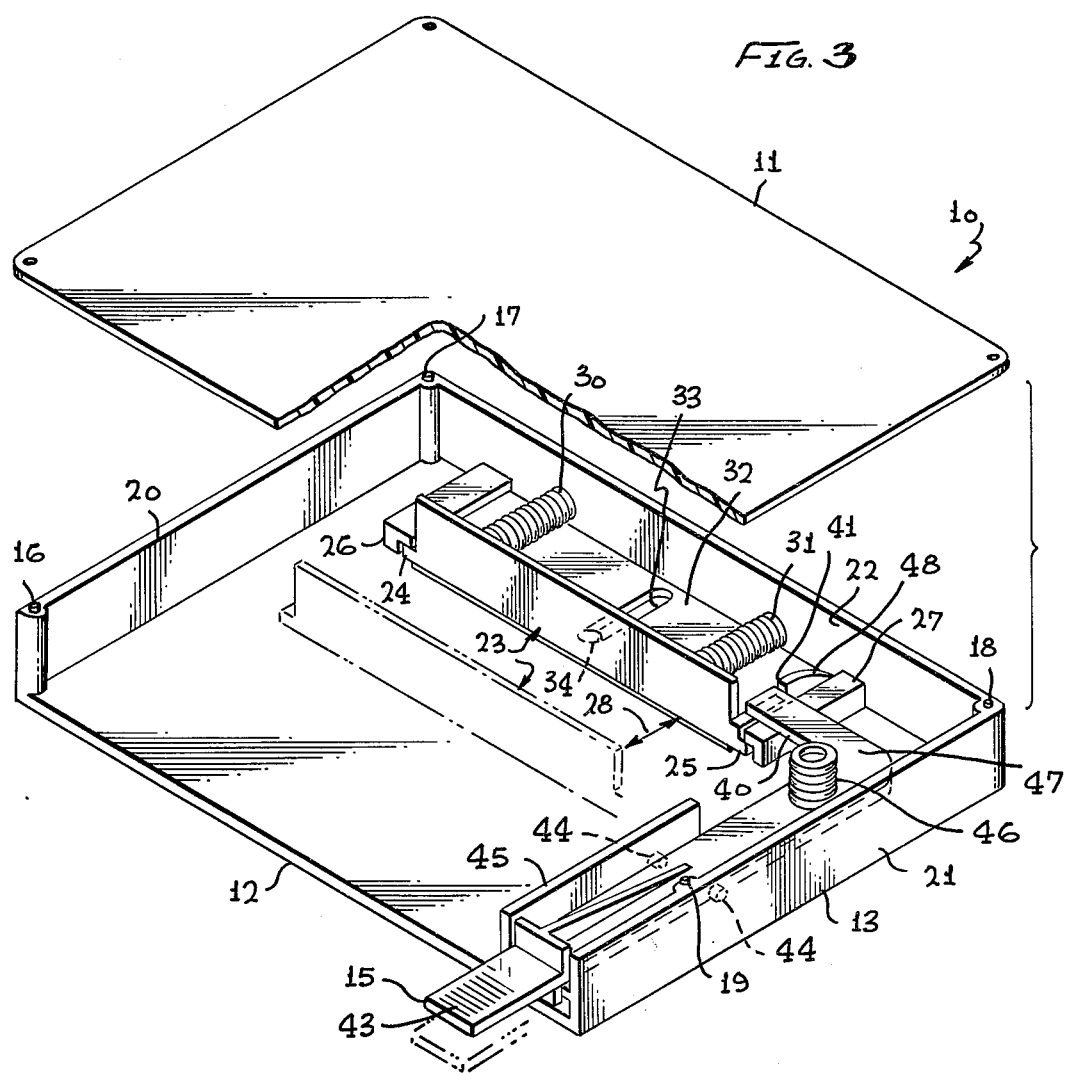

TAPE CARTRIDGE DISPENSER

BACKGROUND OF THE INVENTION

1. Field of the Invention

This invention relates to recording tape cartridge storage systems and, more particularly, to a novel tape cartridge storage apparatus for releasably holding a tape cartridge and whereby a plurality of such apparatus may be detachably connected together.

2. Description of the Prior Art

For many years, it has been the conventional practice to pre-record music, voice, entertainment renditions, and other data on an endless loop of tape such as magnetic which is carried in a cartridge adapted to be inserted into a suitable play-back mechanism, such as a tape recorder. In some instances, data is recorded on a paper tape carried in a cartridge as a unit. The individual tape cartridges are separate units from the recorder or play-back mechanism and when a particular tape is selected, the cartridge carrying the tape is inserted into the tape recorder so that a drive roller engages with an exposed portion of the tape for driving the tape past a play-back head. Although such systems have been in use for many years, space requirements for storing tape cartridges are extremely limited and restricted so that orderly storage of many tape cartridges becomes awkward and creates a problem for the owner.

Normally, in the home or in an automobile, several tape cartridges may be kept in a cabinet or storage compartment or in some instances, a separate wall unit may be installed for holding a quantity of tape cartridges from which the operator may select a particular cartridge. The operator removes the selected cartridge from the storage compartment or cabinet and manually inserts the cartridge into the tape recorder where the play-back mechanism automatically commences play-back of the prerecorded selection.

Many difficulties and problems have been encountered when employing separate storage compartments for tape cartridges in that such a compartment occupies a relatively large volumetric area in addition to the space occupied by the tape recorder. In other instances, the storage compartment is intentionally made of relatively small size so as to hold perhaps five tape cartridges which are selected by the operator from a master storage arrangement and subsequently transferred to the area of limited storage.

Furthermore, most prior cartridge storage devices do not have a means for forcibly ejecting a selected cartridge so that the cartridge must be removed by finger grasping of the cartridge edges to effect removal.

Recently, the overall size of conventional tape cartridges has been reduced by closely packing the coils or loops of tape and these new tape storage units are known in the art as "cassettes". Although the overall size has been reduced, the cassettes are handled in the same way as the tape cartridges so that storage and handling of the cassettes is identical to the procedures for handling tape cartridges.

Therefore, it can be seen that a long standing need has existed for a suitable tape cartridge or cassette storage system which not only stores a quantity of cartridges, but provides a simple and suitable means for forcibly ejecting a selected cartridge from the stored quantity.

SUMMARY OF THE INVENTION

Accordingly, the above-mentioned difficulties and problems have been obviated by the present invention which provides a novel tape cartridge or cassette storage apparatus comprising a storage means having a box-like container including an internal storage compartment or cavity having one side open serving as an entrance leading into the cavity. The other or back side of container operably mounts a releasable lock or actuator mechanism having spring bracing means for forcibly urging a stored cartridge out of the cavity. Finger operated lever means selectively engages with the actuator means for releasing the actuator means. The lever means which when pivoted causes an extended finger or arm to disengage with the actuator means to forcibly urge the cartridge out of the container through the entrance from its storage position within the cavity. Mounting means are provided for arranging a plurality of the box-like containers in and orderly stack or pile.

Further means are provided for registering and aligning the plurality of the containers including the stored tape cartridges so that multiple cartridges can be stored in a unitary manner.

Therefore, it is among the primary objects of the present invention to provide a novel tape cartridge or cassette storage apparatus incorporating a cartridge or cassette actuating mechanism for manually urging or ejecting a selected cartridge or cassette out of a storage apparatus.

Another object of the present invention is to provide a novel tape storage apparatus wherein a multiplicity of tape cartridges or cassettes may be releasably carried in individual holders or containers which include pivoted lever mechanisms for manually moving or positioning the selected cartridge or cassette out of the holder in response to manual actualization of the lever mechanism.

Still another object of the present invention is to provide a novel tape storage apparatus in which a plurality of tape cartridges or cassettes are releasably carried on individual holders which include pivoting actuating mechanisms for individually selecting the removal or release of a cartridge or cassette from an individual holder or container.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of the novel tape cartridge or cassette dispenser of the present invention;

FIG. 2 is a view similar to the view of FIG. 3 illustrating removal of the tape cassette or cartridge when the lever mechanisms are actuated;

FIG. 3 is an exploded perspective view of the novel dispenser shown in FIG. 1 illustrating a cover panel thereof removed to expose the internal storage cavity and the lever and actuator mechanisms;

DESCRIPTION OF THE PREFERRED EMBODIMENT

Figure 4:
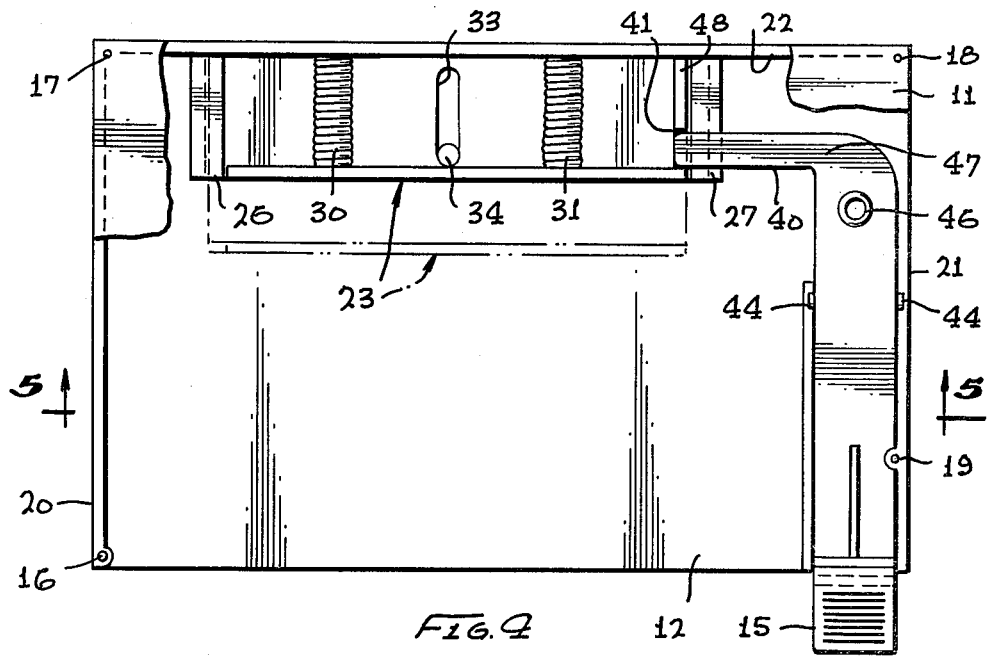
FIG. 4 is a top view of the tape dispenser shown in FIGS. 1 and 2 illustrating the lever and actuator mechanisms.

Referring to FIG. 1, the novel tape cartridge or cassette holder or apparatus of the present invention is illustrated in the direction of arrow 10 which includes a pair of side panels 11 and 12 separated by a U-shaped spacer 13 forming the opposite ends and the back side of the holder. The arrangement of the side panels 11 and 12 and the spacer 13 provides an internal cavity defined between the opposing surfaces of the panels and the spacer wherein the cavity is intended to be occupied by a tape cartridge or cassette indicated in general by the numeral 14. The front side of the holder defines an opening or entrance leading into the internal cavity intended to be occupied by the cartridge or cassette. Once the cassette has been insertably received within the cavity as defined through the entrance, removal or ejection of the cassette is effected by actuation of a lever mechanism indicated broadly by the numeral 15.

In FIG. 2, it can be seen that the cassette or tape cartridge 14 is being ejected from the storage cavity of the holder 10 when the cantilevered end of the lever mechanism 15 is depressed manually. The actuating mechanism associated with the lever mechanism will be described later. It is also to be noted from FIGS. 1 and 2 that the side panel 11 is removably carried on corner pins such as pins, 16, 17, 18 and 19 carried on the corners of the U-shaped spacer 13. The side panel 12 is permanently secured to the opposite side of the U-shaped spacer; however, side panel 11 may be removed by urging the panel off of the pins 16-19 respectively. Each corner of the side panel 11 includes a hole which insertably receives an associated pin. An interference fit is provided between the pin and the corner holes so that the side panel is affectively snap-locked into position. However, it is to be understood that the side panel is releasable when forcibly urged from the pins. As will be described later, the side panel 11 is removed for stacking a plurality of tape holders in a suitable arrangement or array.

In the exploded view of FIG. 3, it can be seen that the side panel 11 is readily removable from the U-shaped spacer 13 and that the U-shaped spacer includes a pair of opposite legs 20 and 21 joined by a back side 22.

An actuator mechanism is located within the storage compartment of the holder and it comprises a push bar 23 having outwardly projecting feet 24 and 25 which are captured within the groove of opposite guides 26 and 27 respectively. The push plate 23 moves back and forth in the direction of the direction of the double arrow 28 from its position in solid lines to the position shown in broken lines. This action forces ejection of the tape cartridge or cassette from the storage compartment into the position shown in broken lines in FIG. 2. Upon insertion of the cassette or cartridge, the push plate or member 23 is retracted to the position shown in solid lines causing a pair of resilient members such as springs 30 and 31 to be compressed between the rear surface of the push plate 23 and the back side 22. A stroke limiter is provided by mounting the push plate 23 on a slide 32 which includes an elongated slot 33. A pin 34 is carried on the side panel 12 and projects through the slot 33. The opposite ends of the slot 33 engage with the pin 34 to limit the stroke or movement of the push bar or plate.

The actuator mechanism described immediately above is operated by the lever mechanism 15. The lever mechanism includes a latch member 40 selectively engagable with a catch shoulder 41 carried on the sliding push plate 23. As illustrated, the latch 40 is engaged with the catch shoulder 41 so that the springs 30 and 31 are compressed and the push plate 23 is held in its rearward position as shown in solid lines so that maximum storage area is available within the storage compartment. However, when the latch 40 is disengaged with the catch shoulder 41, the push plate 23 is forcibly urged outwardly under the expansion of the springs 30 and 31 to the stroke limit where the pin 34 engages with the end of the slot 33. The latch 40 is disengaged with the catch shoulder 41 when the exposed end of a lever arm 42 is depressed as shown in broken lines. The exposed portion is preferably grooved or knurled as indicated by numeral 43 to permit depression by the users finger. The lever arm 42 is pivoted at its mid-section by pivots 44 engagable with the leg 21 on one side and a pivot support 45 on its opposite side. A normally compressed spring 46 is disposed between the top of the lever arm 42 and the under side of side panel 11 so as to normally bias the tab 43 upwardly into the position shown in solid lines. Therefore, when the tab 43 is depressed into the position shown in broken lines, the spring is compressed to permit the latch 41 to raise out of the notch or groove immediately ahead of the catch shoulder 31. It is to be particularly noted that the arm 42 includes a lateral extension 47 having its terminating end constituting the latch 40. The latch 40 is reset into position against the catch shoulder 31 when the push plate 23 is urged rearwardly towards the back plate 22 by means of a tapered cam surface 48. When moving in the rearward direction, the cam surface 48 engages with the underside of the lever 40 and urges the lever against the expansion force of spring 46 until the latch 40 crosses over the shoulder 31 and then the expansion force of spring 46 takes over to urge the latch into the slot or groove immediately ahead of the shoulder catch 41.

As shown in FIG. 4, the movable back plate 23 moves between the position shown in solid lines and the position 23 prime shown in broken lines. The latter position causes the contents of the storage compartment to be ejected through the entrance exteriorly of the holder. The slider or push plate 23 will outwardly move until engagement of the pin 34 with the rear end of the slot 33.

Figure 5:
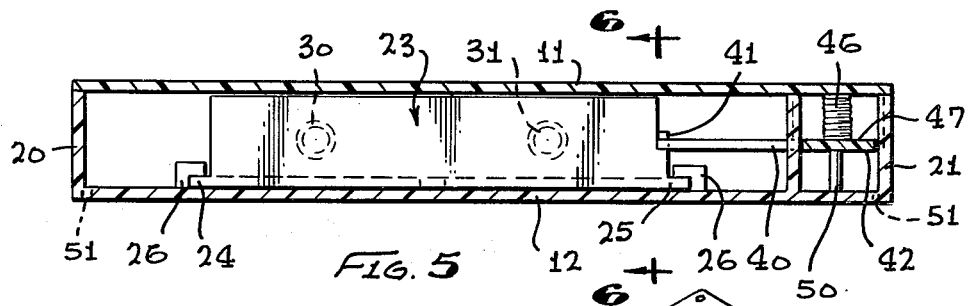
FIG. 5 is a transverse cross sectional view of the dispenser as taken in the direction of arrows 5—5 of FIG. 4.

In FIG. 5, it can be seen that the opposite ends of the push plate 23 are provided with members 24 and 25 that are captured within grooves provided in runners or guides 26 and 27 respectively. It can also be seen that the spring 46 bears at one end against the under side of the panel 11 while its opposite end bears against the lever arm 42. An upright stop 50 prevents the lever arm 42 from being pivoted further on its pivots 44 by spring 46 when the push plate or slide member is in the eject or outward position.

Figure 6:
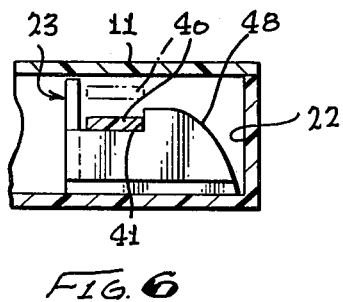
FIG. 6 is a sectional view of the lever mechanism in its latched position with the actuator as taken in the direction of arrows 6—6 of FIG. 5.
Figure 7:
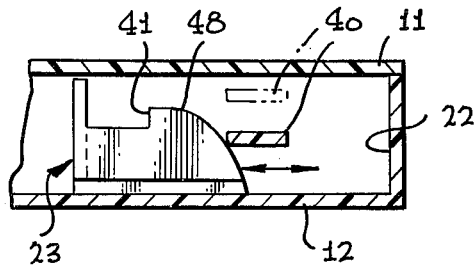
FIG. 7 is a view similar to the view of FIG. 6 showing the lever in its unlatched position with respect to the actuator.

Referring in detail to FIG. 6, it can be seen that the latch 40 is engaged with the shoulder catch 41 to restrain the push plate 23 in its rearmost and cocked position. When the lever arm 42 has been depressed by manual depression of the external tab 43, the latch 40 takes the position shown in broken lines and the springs 30 and 31 forcibly urge the slider plate or push plate forward to the position shown in FIG. 7. Once the push plate has so expanded to its limit, the latch will drop to the position shown in solid lines in FIG. 7 to rest on top of the stop pin 50. When it is desired to reset the mechanism, the push plate 23 is moved in the direction of the back plate 22 so that the latch 40 rides upwardly on the cam 48. When the latch has reached the top of the cam, the slider is continued to be moved rearwardly until the latch drops ahead of the shoulder catch 41 into the recessed area provided.

Figure 8:
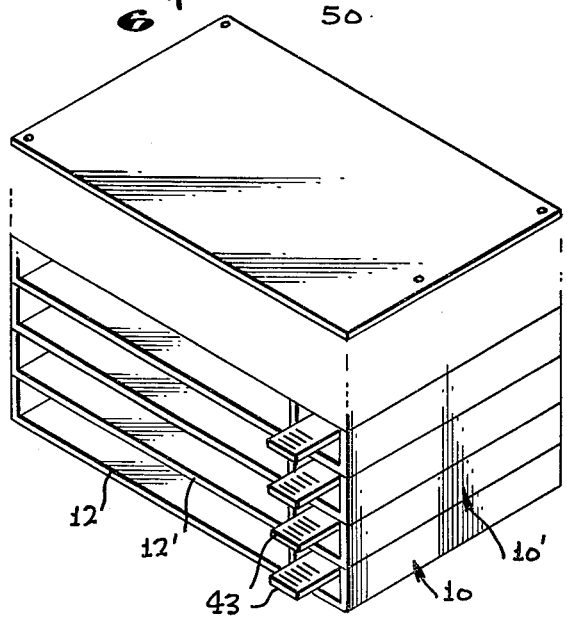
FIG. 8 is a perspective view of a plurality of the dispensers arranged in a unitary structure to provide a storage apparatus for a multiple of tape cassettes or cartridges.

Referring in detail to FIG. 8, a plurality of tape storage holders 10 are illustrated which are arranged in a unitary structure so as to provide a cabinet-like storage arrangement. Each cassette or cartridge is stored in its own holder and may be released from the holder by depression of its associated finger lever means. The plurality of holders are identical in construction as previously described with respect to the FIGS. 1-7 inclusive. However, it is to be particularly noted that the side 11 as shown in FIG. 3 is readily removable from the U-shaped spacer by urging the respective pins out of the mated holes on the panel 11. Once the panel 11 has been removed, the pins or posts 16-19 inclusive associated with the holder may be inserted into holes provided in the panel 12 associated with an adjacent holder. For example, the pins or posts outwardly projecting from the spacer 13 associated with a holder 10 may be inserted into the respective indexed holes in the adjacent panel or side wall 12 of the next holder. The holes in the panel 12 are indicated by numeral 51 in FIG. 5.

Therefore, it can be seen that the panel 12 is integral with the spacer 13 while the panel 11 is removable from the opposite sides of the spacer. As shown in FIG. 8, four or more holders are connected together in the manner immediately described above. Therefore, a plurality of magnetic tape cartridges or cassettes or video units may be stored in a multiple manner resembling a cabinet. As stored, each tape may be readily removed by depression of a selected lever mechanism associated with the desired or chosen tape cartridge, cassette, or video unit.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A holder apparatus for storing a tape cartridge or cassette comprising the combination of:

a holder having opposite side panels separated by a U-shaped spacer so as to define a storage compartment for storing the tape cartridge or cassette between the opposing surfaces of said side panels and said U-shaped spacer;

actuator means operably carried on said holder movable within said storage compartment to slide back and forth for limited movement to accept or eject the tape cartridge or cassette;

latch means operably carried on said holder and cooperatively connected to said actuator means for selectively releasing said actuator means; and resilient means interposed between said spacer and said actuator means for forcibly urging said actuator means to eject the tape cartridge or cassette from said storage compartment in reponse to release by said latch means;

said holder side panels including a selected side panel detachably connected to said spacer and said connection including pins and holes indexed in registry in an interference fit;

said actuator means includes a push member carried on the end of said resilient means;

guide means carried on said side panel opposite to said selected side panel for guiding sliding movement of said push member in a rectilinear manner.

2. The invention as defined in claim 1 including:

movement limiting means interconnecting said push member with said selected side panel for limiting the length of sliding stroke of said push member.

3. The invention as defined in claim 2 wherein:

said latch means includes a catch shoulder carried on said push member; and a spring biased lever arm normally engaged with said catch shoulder to prevent movement of said push member.

4. The invention as defined in claim 3 wherein:

said latch means further includes a reset means comprising a tapered cam carrier on said push member movable with said push member to slidably engage with said lever arm to effect engagement of said lever arm with said catch shoulder.

5. The invention as defined in claim 4 wherein:

said lever arm is pivotally carried on said holder and further includes:

a finger laterally extending from one end thereof having a terminating end engagable with said catch shoulder and the opposite end thereof outwardly projecting from said holder for manual depression.

6. The invention as defined in claim 5 wherein:

a plurality of said holders are provided and each holder includes a removable side panel; and said side panel opposite to said selected side panel having holes provided therein for registry with said pins from and adjacent holder so that a stack of holders is provided.

7. The invention as defined in claim 6 wherein:

said latch means includes a stop post carried on said other side panel limiting pivotal movement of said lever arm whereby said lever arm finger resides in interference with said tapered cam when said puch member moves theretowards.

8. The invention as defined in claim 7 wherein:

said U-shaped spacer includes opposite side legs joined by the opposite ends of a back member.

* * * * *